W. LUXMORE.
VEHICLE DRIVING MECHANISM.
APPLICATION FILED JAN. 14, 1910.
1,045,576. Patented Nov. 26, 1912.
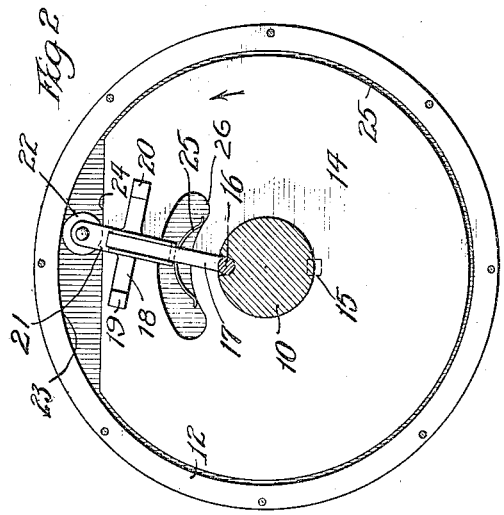
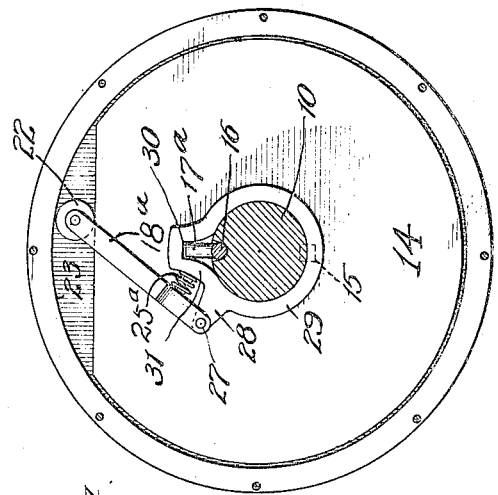
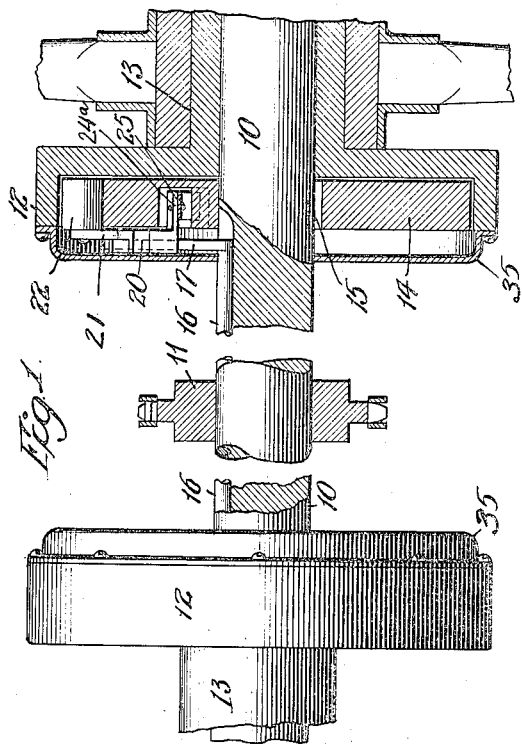
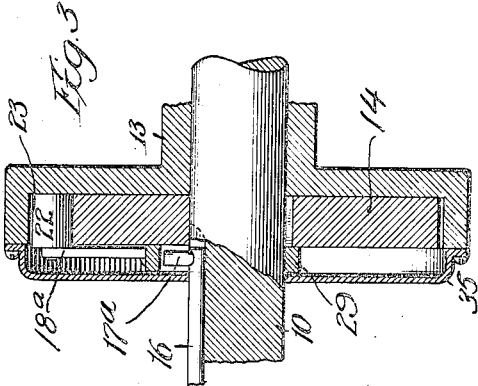
WITNESSES
INVENTOR
William Luxmore

UNITED STATES PATENT OFFICE.

WILLIAM LUXMORE, OF CHICAGO, ILLINOIS.

VEHICLE DRIVING MECHANISM.

1,045,576.

Specification of Letters Patent.  Patented Nov. 26, 1912.

Application filed January 14, 1910. Serial No. 538,051.

*To all whom it may concern:*

Be it known that I, WILLIAM LUXMORE, a citizen of the United States, and a resident of Chicago, in the county of Cook and State of Illinois, have invented certain new and useful Improvements in Vehicle Driving Mechanism, of which the following is a specification.

This invention relates to systems of power transmission in general and more particularly to driving mechanism for automobiles and similar vehicles and has special reference to the provision of an improved construction of vehicle gearing wherein a propeller shaft is adapted to drive a live rear axle, without the use of a differential gearing which necessitates dividing the axle or employing a longitudinal sleeve rotatable on said axle as is commonly found necessary, in order to transmit power from the motor to the driving wheels and automatically vary the speed of the driving wheels relatively to each other when describing a curve. A construction to allow such varying of the speed is required in view of the unequal travel of the wheels when the vehicle turns a corner or otherwise departs from a straight line, which would force one of the wheels to slip were both fixedly secured to the same axle, thus causing undue wear on the tires and great stress on the driving elements.

The principal objects of my present invention are to provide a simple, strong and efficient compensating device which will permit the employment of an integral live axle which may be drivable by a propeller shaft, and a construction wherein the driven wheels may be mounted for rotation directly upon such drive axle, a device of the character indicated which will permit the use of standard forms of automobile wheels without alteration in the construction of such wheels, and a construction wherein both the wheels and the compensating or clutch mechanism carried by the axle may be readily assembled, dismounted, repaired or replaced; to provide means for positively actuating simultaneously in either direction the connections between the shaft and both of the driven wheels, in order to prevent the transmission of power through one of the driving wheels only save when rounding a curve, and to prevent the vehicle from getting beyond control whether by coasting backward when stopped on an ascending grade, or forward when descending a grade, without opposition of the motor to which the propeller shaft or driving connection is coupled.

In the accomplishment of the objects above stated, as well as the attainment of certain further objects and advantages which will hereinafter appear, I have provided the construction illustrated in the accompanying drawing wherein—

Figure 1 is a sectional view of an automobile drive mechanism equipped with a construction of compensating device embodying my improvements in preferred form; Fig. 2 is an elevation of the device of Fig. 1, taken at right angles thereto, the cover plate being removed. Fig. 3 is a sectional detail view of another embodiment of my invention, and Fig. 4 is an elevational view of the device of Fig. 3 taken at right angles thereto.

Referring more particularly to Figs. 1 and 2 of the drawing, it will be observed that in the embodiment of my invention which I have here shown, I make use of a solid continuous rear axle 10 carrying the gear 11 adapted to be driven by means of a propeller shaft or other drive connection with the motor, mounting at each end of the exle 10 an annular flanged member 12 rotatable relatively thereto. The flange 12 is preferably formed integrally with the axle box or hub bushing 13, in order to simplify the construction, though where desired it may be in the form of an annular rim attached to the wheel hub or spokes, and is fixed against movement relatively to the wheel. Each end of the axle 10 also carries a disk 14 fixed thereupon to turn therewith, by the key 15.

To provide means for positively locking the axle and one only of the wheels against movement relatively to each other when the vehicle is moving in a curved line, and prevent the other wheel from locking in the reverse position, *i. e.* for engaging the flanges and disks, I mount for movement simultaneously with the axle 10 a rocker shaft 16, here shown as carried in a groove milled in the shaft, such rocker shaft being provided at each end with a rocker arm 17 upon which is mounted for reciprocal movement a cross head 18 having extending arms 19 and 20 contacting with the face of the disk 14 in order to prevent any twisting of the arms relatively to the shaft. The upper extension 21 of said cross head is provided with a roller 22 arranged between the inner surface 23 of said flange 12 and the flat cut away portion 24 of the said disk 14, so as to provide means for wedging said flange and disk together as above indicated. The lower end of the cross head 18 is provided with an inwardly extending arm 24ª against which a spring 25 inserted under compression in a seat 26 cut in said disk 14, is adapted to press, in order to hold the roller 22 in contact with the rim surface 23, and thereby insure at all times its action as a connecting or clutch device according to the movement of the rim 12.

To prevent the entrance of dust or other foreign matter into the device just above described a cover plate 35 encircling the axle 10 is closely attached to the rim 12 care being taken that such cover plate does not contact with the cross head 18 and thereby restrain the movement thereof, but close enough to assist in guiding the cross head 18.

Referring to the embodiment of my invention shown in Figs. 3 and 4 it will be noted that it differs from the device embodied in Figs. 1 and 2 in this that the roller 22 is carried at the upper end of a link 18ª pivoted at 27 to an arm 28 on a collar 29 encircling the shaft 10 and rotatable thereon. The said collar 29 actuating the rocker arm 17ª of the rocker shaft 16 by means of its engagement with a socket 30 formed in a boss 31 on said collar, and the roller 22 is held in contact with the rim surface 23 by means of a spring 25ª inserted under compression between the link 18ª and the boss 31.

The operation of my invention is as follows: Assuming the device of Fig. 2 to represent the inner aspect of the hub of a wheel traveling forward, the disk 14 will be rotated by the axle 10 in the direction indicated by the arrow, whereas the wheel and its hub carrying the rim 12 will tend to remain stationary. By virtue of the contact of the roller 22 with the surface 23 of the said rim 12, and the movement of the said disk 14, said roller will tend to force the surfaces 23 and 24 apart, but such tendency is overcome by the convergence of such surfaces and the members 12 and 14 are locked together by their contact with the intermediate roller 22, a like action taking place in the device at the opposite end of the axle 10. Assuming the vehicle to describe a curve toward the left, the left wheel being firmly fixed against rotation on the axle 10 by the mechanism at its end of the shaft, the right wheel will move more rapidly than the left, which will cause the rim 12 to move more rapidly than the disk 14, thus using the member 22 as a roller instead of a clutch, tending to withdraw the roller 22 from contact with the surface 24 of said disk, and leaving the right wheel free to rotate upon the shaft and at an accelerated rate, but as soon as the vehicle again moves in a right line, the operation first described is repeated and the wheel becomes locked on the shaft.

It will be obvious from an inspection of the drawings that the function of the rocker shaft 16 is to prevent other than a simultaneous movement of the arms 17 and thence action of the rollers 22 at all times when the vehicle is moving forward in a right line, or tends to descend when stopped on a grade to prevent any but a momentary simultaneous free movement of both wheels on the axle and thereby to prevent any movement of the vehicle, unrestrained by the motor, in either a forward or a backward direction, and to prevent dragging of either wheel through floating of its roller or transmission of power through one driving wheel only at any time save when the vehicle is turning a corner or otherwise departing from a straight line.

It is believed that the operation in all directions of vehicle movement of both of the constructions embodying my improvements here shown will be understood by those who are skilled in the art to which my invention pertains without further detailed description.

Having thus described my invention and illustrated its use, what I claim as new and desire to secure by Letters Patent is the following:

1. In combination a rotatable axle, a driven member rotatably mounted on said axle, a driving member fixed against rotation on said axle, means operable by the relative movement of said driving and driven members for locking them against relative movement, and means whereby said locking means is normally held positively in operative relation to said rotatable and non-rotatable members to at all times permit one of said members to rotate more rapidly than the other.

2. In combination a shaft member, a member on said shaft non-rotatable relative thereto, a member rotatable thereon, means for imparting motion to one of said members, rocker means operable by the relative movement of said rotatable and non-rotatable members for locking them against relative movement, and means normally holding said locking means positively in operative relation to said rotatable and non-rotatable members to at all times permit one of said members to rotate more rapidly than the other.

3. In combination, a driving shaft having at each end a driven member rotatably mounted on said shaft, and a driving member non rotatable on said shaft, a rocker shaft carried by said driving shaft, and means carried by said rocker shaft and operable by the relative movement of said drive and driven members for normally locking them against relative movement.

4. In combination, a driving shaft having at each end a driven member rotatably mounted on said shaft, and a driving member non rotatable on said shaft, a rocker shaft carried by said driving shaft, and means carried by said rocker shaft for normally locking the drive and driven members against relative movement.

5. In combination, a driving shaft having mounted at each end thereof a vehicle driving wheel, and a drive member adapted to co-act, one of said co-acting members being rotatable relatively to said shaft and the other non rotatable relatively thereto, a rocker shaft carried by said driving shaft, having rocker arms at each end thereof, and means carried by said rocker arms for locking both of said drive and driving members against relative movement when the vehicle is moving in a right line and adapted to permit free relative movement of one of said drive and driving members when the vehicle describes a curve.

6. In combination, a driving shaft having mounted at each end thereof a vehicle driving wheel and a drive member adapted to co-act, one of said co-acting members being rotatable relatively to the shaft and the other non rotatable relatively thereto, and a rocker shaft carried by said driving shaft having at each end thereof, rocker arms each provided with a roller interposed between one of said drive and driving members for locking both of said drive and driving members against relative movement when the vehicle is moving in a right line and adapted to permit free relative movement of one of said drive and driving members when the vehicle describes a curve.

7. In combination, a driving shaft having rotatably mounted at each end thereof a vehicle driving wheel carrying a projecting annular flange, and a disk 14 non rotatable relatively to said shaft, said disk being arranged within said flange and having a portion of its periphery cut away, and a rocker shaft carried by said driving shaft having at each end thereof a rocker arm provided with a roller interposed between said cut away portion of said disk and said flange for locking both of said drive and driving members against relative movement when the vehicle is moving in a right line and adapted to permit free relative movement of one of said drive and driving members when the vehicle describes a curve.

8. In combination, a driving shaft having rotatably mounted at each end thereof a vehicle driving wheel carrying a projecting annular flange, and a disk 14 non rotatable relatively to said shaft, said disk being arranged within said flange and having a portion of its periphery cut away, and a rocker shaft carried by said driving shaft having at each end thereof a rocker arm provided with a roller interposed between said cut away portion of said disk and said flange and a spring pressing said roller against said flange, for locking both of said drive and driving members against relative movement when the vehicle is moving in a right line and adapted to permit free relative movement of one of said drive and driving members when the vehicle describes a curve.

9. In combination, a driving shaft having rotatably mounted at each end thereof a vehicle driving wheel and a non rotatable projection, one of said members being provided with a projecting annular flange and the other with means adapted to co-act with said flange, a rocker shaft carried by said driving shaft having at each end thereof means interposed between said flange and co-acting means for locking both of said drive and driving members against relative movement when the vehicle is moving in a right line and adapted to permit free relative movement of one of said drive and driving members when the vehicle describes a curve.

10. In combination, a driving shaft having rotatably mounted at each end thereof a vehicle driving wheel and a non rotatable projection, one of said members being provided with a projecting annular flange and the other with means adapted to co-act with said flange, a rocker shaft carried by said driving shaft having at each end thereof a rocker arm provided with a roller interposed between said flange and co-acting means and a spring for holding said roller in contact with the element carried by the driving wheel for locking both of said drive and driving members against relative movement when the vehicle is moving in a right line and adapted to permit free relative movement of one of said drive and driving members when the vehicle describes a curve.

11. In combination, a driving shaft having at each end thereof, a driven member rotatably mounted thereon, and a driving member non rotatable thereon, means at each end of said shaft operable by the relative movement of said drive and driven members for locking them against relative movement, and means actuated by said operating means to maintain said rocker arms in alinement and insure simultaneous movement of said operating means.

12. In combination, a driving shaft having rotatably mounted at each end thereof a vehicle driving wheel and a non rotatable projection, one of said members being provided with a projecting annular flange and the other with means for engaging with said flange, rocker arms each provided with a roller interposed between said flange and engaging means and a spring for holding said roller in contact with the element carried by the driving wheel, said rocker arms being connected by a rocker shaft carried by said driving shaft to maintain said rocker arms in alinement and insure simultaneous movement of said operating means.

13. In combination, a rotatable shaft, a driven member rotatably mounted on said shaft, a driving member fixed against rotation on said shaft, means for locking said drive and driven members against relative movement, and means for actuating said locking means operable by the relative movement of said drive and driven members.

14. In combination, a shaft, a non-rotatable member thereon, a member rotatable thereon, means for imparting motion to one of said members, means for locking them against relative movement, and means for actuating said locking means operable by the relative movement of said rotatable and non-rotatable members.

15. In combination, a shaft having at each end a rotatable and a non rotatable member, a connecting member, and means carried by said connecting member for normally locking said rotatable and non-rotatable members against relative movement but permitting one of said rotatable members to rotate more rapidly than the other of said rotatable members.

16. In combination, a rotatable axle, a plurality of members rotatably mounted on said axle, a driving member fixed against rotation on said axle, locking means interposed between said drive and each of said driven members, and a connection between said several locking means, whereby one of said locking members when in operative position maintains the other of said locking members in operable position.

17. In combination, a rotatable axle, a plurality of members rotatably mounted on said axle, a driving member fixed against rotation on said axle, locking means interposed between said drive and each of said driven members, and a connection between said several locking means, whereby said locking means act in unison at all times.

In testimony whereof I have hereunto signed my name in the presence of the two subscribed witnesses.

WILLIAM LUXMORE.

Witnesses:
PAUL CARPENTER,
DONALD C. WILLIAMS.